Nov. 3, 1964     E. P. GRABOWSKI     3,154,859
MEASURING DEVICE
Filed March 26, 1962

INVENTOR.
EDMUND P. GRABOWSKI
BY
ATTORNEY 3,154,859
MEASURING DEVICE
Edmund P. Grabowski, Brooklyn, N.Y., assignor to Monitor Tool & Finding Co., Brooklyn, N.Y., a partnership
Filed Mar. 26, 1962, Ser. No. 182,371
7 Claims. (Cl. 33—143)

The present invention relates to a measuring device and it particularly relates to a device for fixing internal or external dimensions without the necessity of providing rulers, scales or other graduated arrangements.

It is among the objects of the present invention to provide a simple, reliable, light-weight measuring device, in which, by relatively simple manipulations, it will be readily possible to measure an outside length or dimension or an inside opening or dimension without calculations or noting of graduations and with assurance of accuracy if the dimension be laid out on another object to be cut or formed.

A further object is to provide a simple, extensible, adjustable measuring arrangement having wide utilization in building, decorating, carpentry and similar operations.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, according to one embodiment of the present invention, to provide a central slotted frame through which the extensible elements extend.

This frame may be of light-weight inverted U structure and it desirably carries slot ways for the adjustable, extensible members, as well as clamping means to fix the members in a desired position.

Each member may be independently movable and there may be provided in-turned parallel transverse end pieces to enable either outside measuring or inside measuring, as the case may be.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
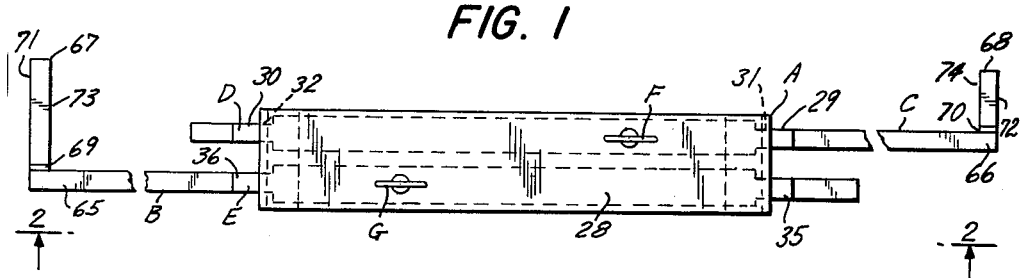
FIG. 1 is a top plan view showing one form of the present invention.
Figure 2:
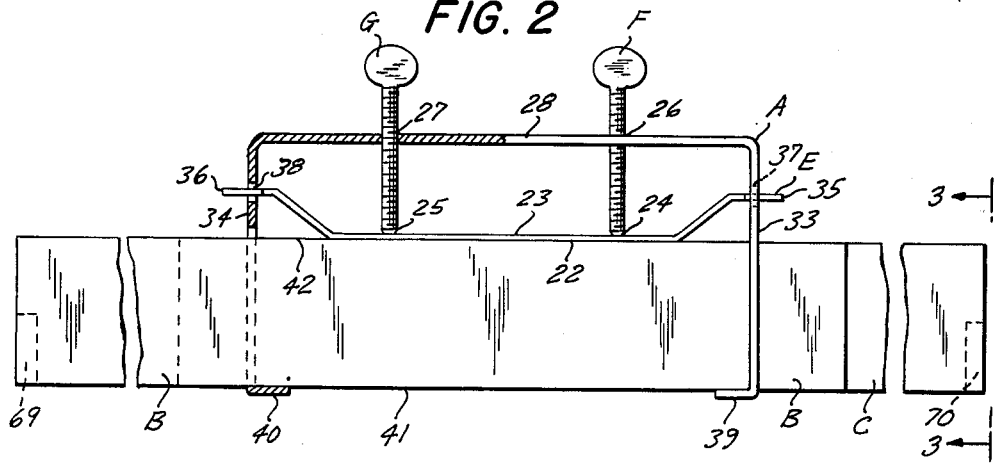
FIG. 2 is a side elevational view taken upon the line 2—2 of FIG. 1, partly broken away to show the clamping arrangement.
Figure 3:
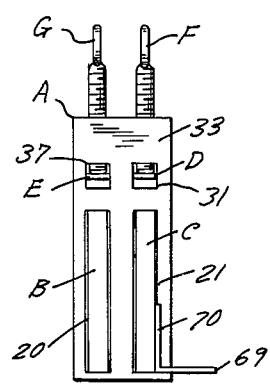
FIG. 3 is an end elevational view showing the slotted side arrangement, as well as the outstanding transverse end measuring lugs.

Referring to FIGS. 1, 2 and 3, there is a central carrier or frame structure A of inverted U-shape through which projects the sliding elongated bar members B and C.

The sliding bar members B and C may be of wood, plastic or aluminum.

The frame structure A, which may also consist of a block, is provided with the mechanical pressure clamping members D and E, which are respectively acted on by the thumb screws F and G.

These members D and E bear directly by mechanical pressure on the sliding bar members B and C.

The rectangular cross-section bar members B and C extend through the slots 20 and 21 and their upper edges 22 are gripped by means of the lower portions 23 of the U-shaped resilient spring members D and E.

These members may be pressed down by the lower ends 24 and 25 of the screws F and G, which extend through openings 26 and 27 in the top horizontal structure 28 of the main support A.

The ends 29 and 30 of the spring member D will extend through these slots 31 and 32 and the vertical side legs 33 and 34 of the support structures A.

At the same time, the ends 35 and 36 of the resilient clamping member E will extend through the openings 37 and 38 in the side legs or side elements 33 and 34.

The lower inturned lug portions 39 and 40 will support the lower edges 41 of the sliding bars C.

The ends 65 and 66 of the bars B and C will have the angle end members 67 and 68 attached thereto by their vertical flanges 69 and 70, and it will be the outer edges 71 and 72 or the inside edges 73 and 74 which will perform the measuring function.

In measuring the distance between parallel walls, or between the inside edges such as a door or window opening, the thumb nuts F and G may be loosened and the bars B and C moved apart until the outer edges 71 and 72 contact the inside faces of the walls or the inside edges of the openings.

Thereupon the thumb screw elements F and G may be screwed downwardly, clamping the horizontal members 23 of the spring elements D and E against the top edges 42 of the sliding bars B and C.

Distance between edges 71 and 72 will be the dimension which may be transferred to another piece or structure which is to be cut to size without the need of calculations or taking down any graduated measurements.

From outside dimensions or outside lengths, the edges 73 and 74 may be similarly contacted with a structure, whether it consists of an elongated piece of furniture, a cabinet or the outside of the frame of a swinging door or other structure.

In this case, the distance between the inside edges 73 and 74 will be the necessary dimension.

Figure 4:
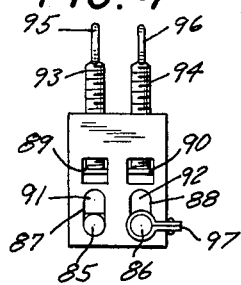
FIG. 4 is an end elevational view showing an alternative form of the invention, as illustrated in FIG. 3.

In the alternative form of the invention shown in FIG. 4, round bars 85 and 86 are utilized, sliding through the lower portions of the slot 87 and 88, with the bars being clamped down by resilient members 89 and 90, which have downwardly inclined portions 91 and 92.

The thumb screws 93 and 94 with the top flat portions 95 and 96 may be used for clamping the rods 85 and 86 in a desired adjusted position.

The ends of the rods will have outstanding clip members 97 to enable contact with the outside or inside edge of the object being measured in the same manner as the angle members 67 and 68 of FIG. 1.

The present device has been particularly developed for taking long measurements with one man operation without the necessity of having two men hold the device.

The device has widespread utilization in the plumbing and electrical fields, and where desired, two of the devices can be used in tandem for extra long measurements.

The clamping members D and E desirably bear directly by mechanical pressure on the sliding members B and C.

However, the clamping members D and E may be eliminated if desired, and the thumb screws F and G may apply direct pressure to contain the sliding members D and C.

If the sliding members are made of plastic, wood or other softened material, the clamping members D and E may be required to prevent multilation of the sliding members.

However, if the sliding members are made of aluminum, the clamps may be eliminated.

It is thus apparent that the applicant has provided a simple measuring arrangement which may be widely employed for determining dimensions and for use in various types of carpentry, steel frame construction or in upholstery or many other uses where quick and accurate measuring is desired without the necessity of painstaking graduated measurements and resultant calculations.

The central U-shaped member A may consist of a solid block and the entire structure may be made of lightweight metal, such as aluminum or magnesium alloys, or even of plastic or wood.

As many changes could be made in the above measuring device, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A measuring system comprising a central slotted support and adjustable extensible parallel bars with end contact elements and means on the support to clamp the bars in an adjusted position, said central slotted support having open ends and a top horizontal wall, vertical end walls and short inturned bottom edges forming end feet on said end walls, vertical parallel elongated slots being positioned in said end walls adjacent and directly above said feet and said bars, resting on and sliding on said feet and extening through said slots and upper short slots above said parallel slots and extension means on the means to clamp the bars in position extending into said upper short slots and said bars being spaced below the upper top wall.

2. A measuring system comprising a central slotted support and adjustable extensible parallel bars with end contact elements and means on the support to clamp the bars in an adjusted position, said support consisting of an inverted U-shaped frame structure having end slots to receive the bars, said central slotted support having open ends and a top horizontal wall, vertical end walls and short inturned bottom edges forming end feet on said end walls, vertical parallel elongated slots being positioned in said end walls adjacent and directly above said feet and said bars, resting on and sliding on said feet and extending through said slots and upper short slots above said parallel slots and extension means on the means to clamp the bars in position extending into said upper short slots and said bars being spaced below the upper top wall.

3. A measuring system comprising a central slotted support and adjustable extensible parallel bars with end contact elements and means on the support to clamp the bars in an adjusted position, said bars being of rectangular cross-section, said central slotted support having open ends and a top horizontal wall, vertical end walls and short inturned bottom edges forming end feet on said end walls, vertical parallel elongated slots being positioned in said end walls adjacent and directly above said feet and said bars, resting on and sliding on said feet and extending through said slots and upper short slots above said parallel slots and extension means on the means to clamp the bars in position extending into said upper short slots and said bars being spaced below the upper top wall.

4. A measuring system comprising a central slotted support and adjustable extensible parallel bars with end contact elements and means on the support to clamp the bars in an adjusted position, said bars being of circular cross-section, said central slotted support having open ends and a top horizontal wall, vertical end walls and short inturned bottom edges forming end feet on said end walls, vertical parallel elongated slots being positioned in said end walls adjacent and directly above said feet and said bars, resting on and sliding on said feet and extending through said slots and upper short slots above said parallel slots and extension means on the means to clamp the bars in position extending into said upper short slots and said bars being spaced below the upper top wall.

5. A measuring system comprising a central slotted support and adjustable extensible parallel bars with end contact elements and means on the support to clamp the bars in an adjusted position, said clamping means consisting of U-shaped spring members and thumb screws to press said spring members in position on the top of said bars, said central slotted support having open ends and a top horizontal wall, vertical end walls and short inturned bottom edges forming end feet on said end walls, vertical parallel elongated slots being positioned in said end walls adjacent and directly above said feet and said bars, resting on and sliding on said feet and extending through said slots and upper short slots above said parallel slots and extension means on the means to clamp the bars in position extending into said upper short slots and said bars being spaced below the upper top wall.

6. A measuring device comprising an inverted U-shaped metal carrier having open sides and integral rectangular top and end walls with inturned short feet, superimposed parallel upper short and lower elongated slots in the end walls, rectangular cross section reciprocable measuring bars sliding on said feet and held in said lower slots, U-shaped springs having oblique side legs with horizontal base and end portions having reduced width end portions projecting through said upper slots and offset screw members in said top wall pressing down said springs against said bars and angle members mounted on the outer ends of said bars, having vertical legs attached to the ends of the bars and horizontal legs extending parallelly from the ends of the bars.

7. The device of claim 6, the upper faces of said bars being positioned substantially below said top wall and said screw members being positioned adjacent the side edges of said top wall and adjacent said end walls.

References Cited in the file of this patent

UNITED STATES PATENTS

| 306,278 | Patch | Oct. 7, 1884 |
| 653,640 | Butrick | July 10, 1900 |
| 728,790 | West | May 19, 1903 |
| 1,853,088 | Sidon | Apr. 12, 1932 |

FOREIGN PATENTS

| 500,668 | Italy | Nov. 19, 1954 |